United States Patent [19]

Zaderej et al.

[11] 4,260,943
[45] Apr. 7, 1981

[54] HIGH FREQUENCY BATTERY CHARGER

[75] Inventors: Andrew Zaderej; George Zaderej, both of South Bend, Ind.

[73] Assignee: Unitron Corporation, Elkhart, Ind.

[21] Appl. No.: 8,181

[22] Filed: Jan. 30, 1979

[51] Int. Cl.³ .............................................. H02J 7/10
[52] U.S. Cl. ...................................... 320/21; 320/32; 320/35; 320/43; 320/60; 363/18
[58] Field of Search ................... 320/21, 30, 32, 33, 320/35, 36, 43, 53, 59, 60; 323/4, 23, 25; 363/18-21, 86, 97

[56] References Cited

U.S. PATENT DOCUMENTS

| 2,920,259 | 1/1960 | Light | 363/18 |
|---|---|---|---|
| 3,244,963 | 4/1966 | Kreckel | 323/4 X |
| 3,534,241 | 10/1970 | Wilson et al. | 320/33 |
| 3,621,363 | 11/1971 | Ginnman et al. | 363/20 |
| 3,639,826 | 2/1972 | Grundberg | 363/19 |
| 4,021,717 | 5/1977 | Furuishi et al. | 320/21 |
| 4,084,219 | 4/1978 | Furukawa et al. | 363/97 X |
| 4,145,572 | 3/1979 | Stewart | 320/21 X |
| 4,172,277 | 10/1979 | Pinson | 363/21 X |

OTHER PUBLICATIONS

Velthooven et al., "Low Cost Forward Converters Ease Switching Supply Design", Electronics, Feb. 2, 1978, pp. 119-123.
Poel, "Pick the Right DC/DC Converter", Electronic Design 12, Jun. 7, 1978, pp. 104-108.
Millman et al., "Pulse, Digital & Switching Waveforms", 1965, pp. 614, 927.

Primary Examiner—A. D. Pellinen
Attorney, Agent, or Firm—Oltsch, Knoblock & Hall

[57] ABSTRACT

A high frequency battery charger operable from a 120 volt AC line power source which is rectified and converted by a blocking oscillator into 20-200 Khz rectified output for battery charging. A sensor for determining full battery charge serves as a power cut off to the battery with provision, if desired, for continued trickle charge of the battery.

9 Claims, 10 Drawing Figures

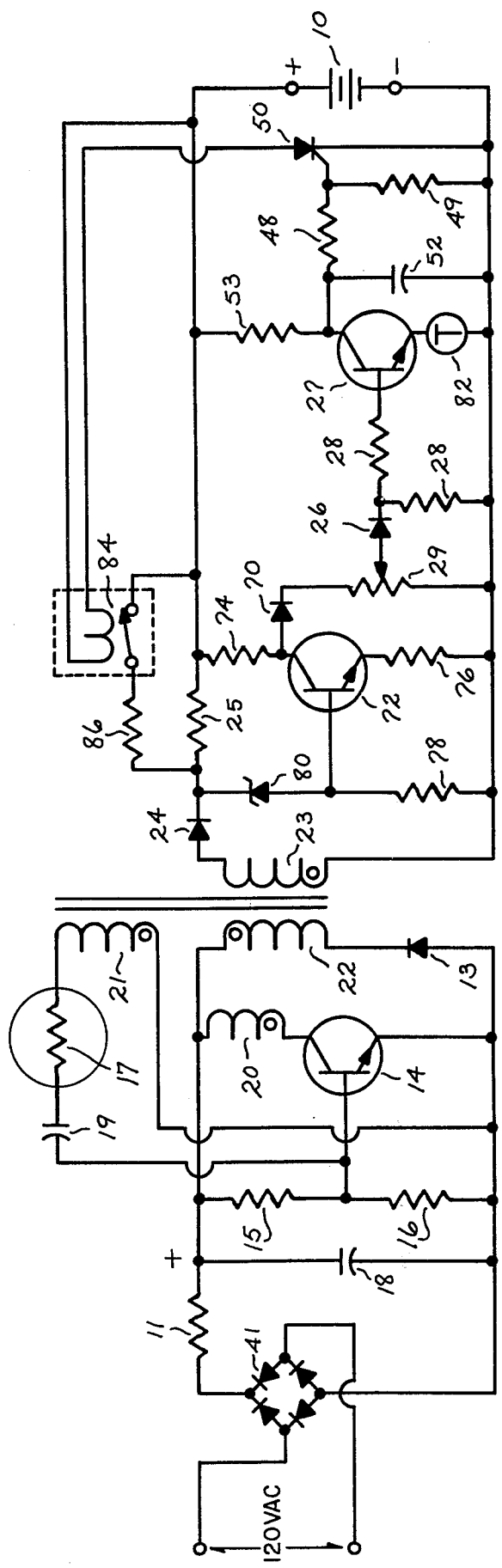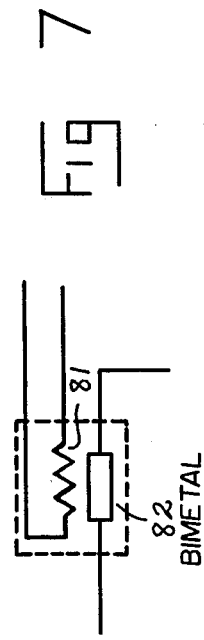

4,260,943

HIGH FREQUENCY BATTERY CHARGER

SUMMARY OF THE INVENTION

This invention relates to a battery charger and will have specific application to a high frequency charger of miniaturized form.

In this invention alternating line current is first rectified and then converted into a high frequency voltage output by a blocking oscillator. The output of the oscillator is then rectified for battery usage. A sensor for monitoring battery charge is provided to cut off or reduce the charging input to the battery as the battery reaches its full charge. Upon cutoff of the charging power to the battery, means may be provided by which a trickle charge maintains the battery at its fully charged level. A feedback compensator may be included in the charger circuit to provide compensation to the battery charge sensor due to variations in charge current. The battery charger of this invention in its various embodiments provides a low ripple, highly efficient high-frequency charging source. This allows for the miniaturization of the components of the charger and permits the charger to be utilized in such devices as powered hand tools and implements.

Accordingly, it is an object of this invention to provide a battery charger which is in miniaturized form.

Another object of this invention is to provide a battery charger utilizing high frequency charger power having a low ripple.

Another object of this invention is to provide a battery charger of low price.

And another object of this invention is to provide a battery charger which is of the high frequency type and of high efficiency.

Still another object of this invention is to provide a miniaturized battery charger for use in powered hand tools and similar implements.

And still another object of this invention is to provide a high-frequency battery charger for nickle-cadmium, lead-acid and other rechargeable batteries.

Other objects of this invention will become apparent upon a reading of the invention's description.

BRIEF DESCRIPTION OF THE DRAWINGS

FIG. 6 is a circuit diagram of the battery charger in which a relay is substituted for the LED-LDR current cutoff component disclosed in the circuit of FIG. 5.

FIG. 7 is an isolated circuit component usable in the circuit shown in FIG. 6 and which can be substituted for the relay in the circuit of FIG. 6

DESCRIPTION OF THE PREFERRED EMBODIMENTS

The preferred embodiments illustrated are not intended to be exhaustive or to limit the invention to the precise forms disclosed. They are chosen and described in order to best explain the principles of the invention and its application and practical use to thereby enable others skilled in the art to best utilize the invention.

Figure 1:
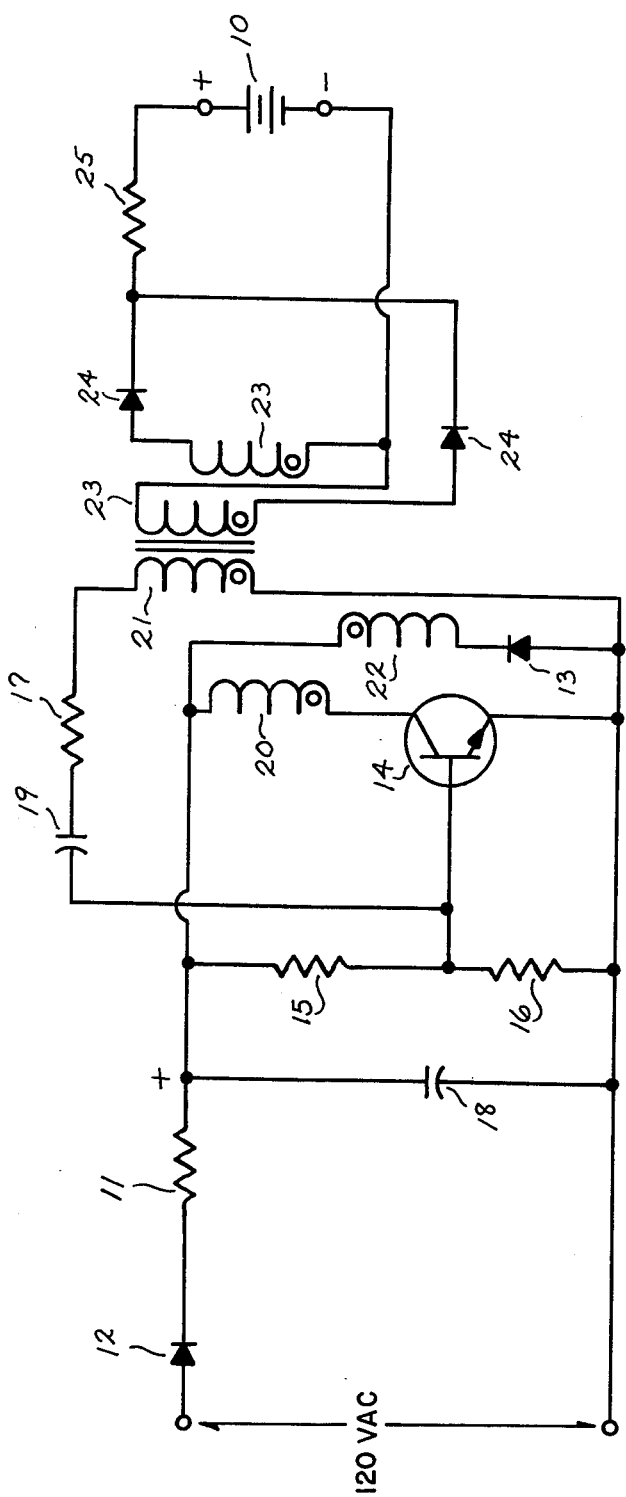
FIG. 1 is a diagram of a basic circuit of the charger of this invention.

In FIG. 1 a basic circuit of the invention is shown. This circuit having a 1.2 Amp charging rate will charge a 6 volt, 1 Amp-hour nickle-cadmium battery in approximately one hour. Battery 10 is removably connected at its terminals into the circuit of the charger. A 120 volt AC line current is rectified to DC through rectifier 12 and resistor 11. This rectified voltage then passes from a filtering capacitor 18 of a blocking oscillator formed by NPN transistor 14, resistors 15, 16 and 17, capacitor 19, main transformer winding 20, return transformer winding 21, back emf transformer winding 22, secondary transformer windings 23 and rectifier 13. Transistor 14 is a high voltage, high frequency transistor and rectifier 13 is of a high voltage, fast recovery type. Main winding 20 and emf winding 22 are wound together or bifilar with the emf winding being in reverse polarity to the main winding as illustrated. During operation of the blocking oscillator the back emf in winding 22 will be transferred to mutually coupled secondary windings 23 and returned to the power source to capacitor 18 through rectifier 13. Emf winding 22 with rectifier 13 limits the voltage to transistor 14 to two times the voltage of capacitor 18. This enables the use of a lower high voltage transistor 14 and prevents the transformer from going to saturation with resulting lower losses. Such emf utilization improves the circuit efficiency for transistor 14 and the transformer of the oscillator. The output from the blocking oscillator is in the 20–200 Khz range and passes through rectifiers 24 into battery 10 through limiting resistor 25, causing charging of the battery.

Figure 2:
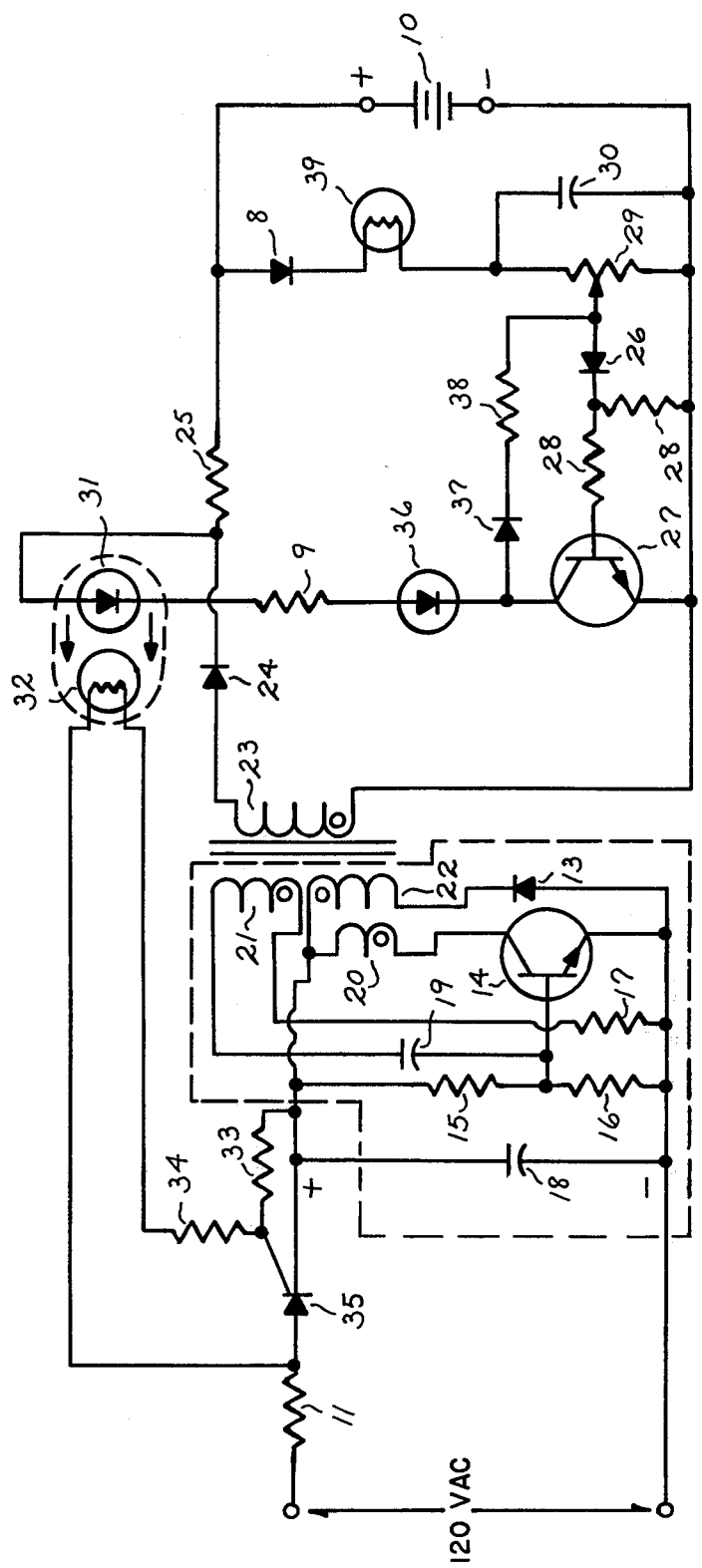
FIG. 2 is a circuit diagram of a battery charger incorporating an SCR current cutoff to the blocking oscillator of the circuit.

The circuit of FIG. 2 utilizes the blocking oscillator concept disclosed and explained with respect to the circuit of FIG. 1 and designated thereby by correspondingly numbered components. The output from the power oscillator passes through a single rectifier 24 for rectification. Additionally, there is a single secondary transformer winding 23 associated with the blocking oscillator of this circuit. Incorporated into the circuit of FIG. 2 between battery 10 and the line power input is a power cutoff which terminates the charging input to battery 10 when the battery reaches its full charged level. A lambda diode 26 is connected between battery 10 and the base of NPN transistor 27 with associated resistors 28 and 29 and capacitor 30. Transistor 27 in turn is connected at its collector to and LED (light emitting diode) 31. LED 31 is photocoupled to an LDR (light dependent resistor) 32. LDR 32 in turn is connected through associated resistors 33 and 34 to an SCR (silicon controlled rectifier) 35. SCR 35 is located in the input line between the power input and blocking oscillator and serves the dual function of rectifying the power line input as well as acting as a switch to isolate the power input from the blocking oscillator. Another LED 36 which serves as a visual indicator is located with current limiting resistor 9 between transistor 27 and LED 31.

When battery 10 is connected to the charger for purposes of charging, the residual voltage in the battery turns on lambda diode 26 which turns on transistor 27. As transistor 27 is turned on, current flow passes through LED 31 causing LDR 32 to change from a high to a low impedance which switches on SCR 35. Upon switching of SCR 35, the blocking oscillator is actuated to cause the charging of battery 10 through the means previously described for FIG. 1. When battery 10 reaches a selected full charge voltage, such as 7½ volts, lambda diode 26 turns off which turns off transistor 27. This causes a lack of current flow through LED 31 with LDR 32 changing from a low to a high impedance, causing the switching off of SCR 35 and the power cutoff to the blocking oscillator.

Diode 37 and series-connected resistor 38 form a high voltage loop from the battery to prevent lambda diode 26 from being turned on again after battery 10 reaches its selected full charge. Capacitor 30 is a filtering capacitor to level any ripple voltage from the battery. A thermistor 39 is connected in series to resistor 29 and capacitor 30 through rectifier 8. Thermistor 39 is placed in heat conducting contact with battery 10 for sensing battery temperature during charging. As battery temperature increases during charging thermistor 39 increases the voltage at the anode of lambda diode 26. By so monitoring the temperature of battery 10 during charging, lambda diode 26 can be caused to turn off in response to battery temperature, which is also indicative of battery charge, thereby terminating the charging input to the battery. Thermistor 39 also acts as a safety feature for the charger. Resistor 29 connected to the anode of lambda diode 26 is of a variable type to allow adjustment of the turnoff voltage for the circuit. With battery 10 fully charged and the power to the blocking oscillator turned off, the battery will experience a slight power drain. Once the charge upon battery 10 drops below a specified amount, the voltage at resistor 29 reaches a specified value which will cause lambda diode 26 to be turned back on, thereby initiating the charging circuit until the selected full battery charge is again reached. This pulsating charge will continue until battery 10 is removed from the charger. This circuit having a 4.0 Amp charging rate will charge a 6 volt, 1 Amp-hour nickle-cadmium battery in approximately 15 minutes.

Figure 3:
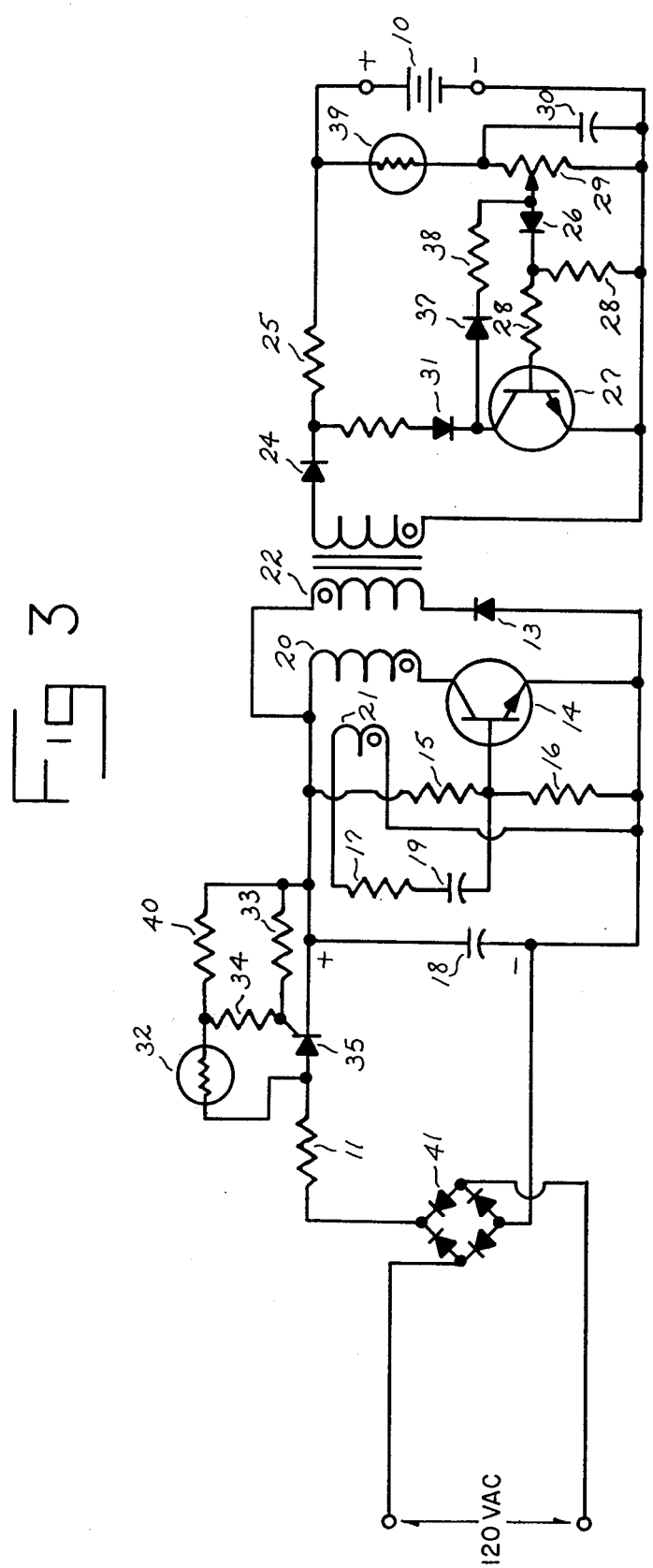
FIG. 3 is a circuit diagram of the battery charger similar to the charger shown in FIG. 2 with the visual charging indicator omitted.

In FIG. 3 another embodiment of the charger similar to that shown in FIG. 2 is presented. Thus those components and their functions correspondently mentioned and discussed with respect to FIGS. 1 and 2 are also shown in FIG. 3. LED 31 is photoelectrically coupled to LDR 32. In this circuit the visual indicator LED 36 utilized in FIG. 2 is omitted. This diode as utilized in FIG. 2 serves as a visual indicator that the charger is in its charging mode and thus, at the discretion of the designer of the charger, may or may not be included in the circuit. An extra resistor 40 is associated with SCR 35 to desensitize the SCR and thus make the SCR less sensitive to turn on. A bridge circuit 41 is further included in FIG. 3 to provide additional power for the circuit. In other respects the manner of operation of the circuit of FIG. 3 is like that of FIG. 2.

Figure 4:
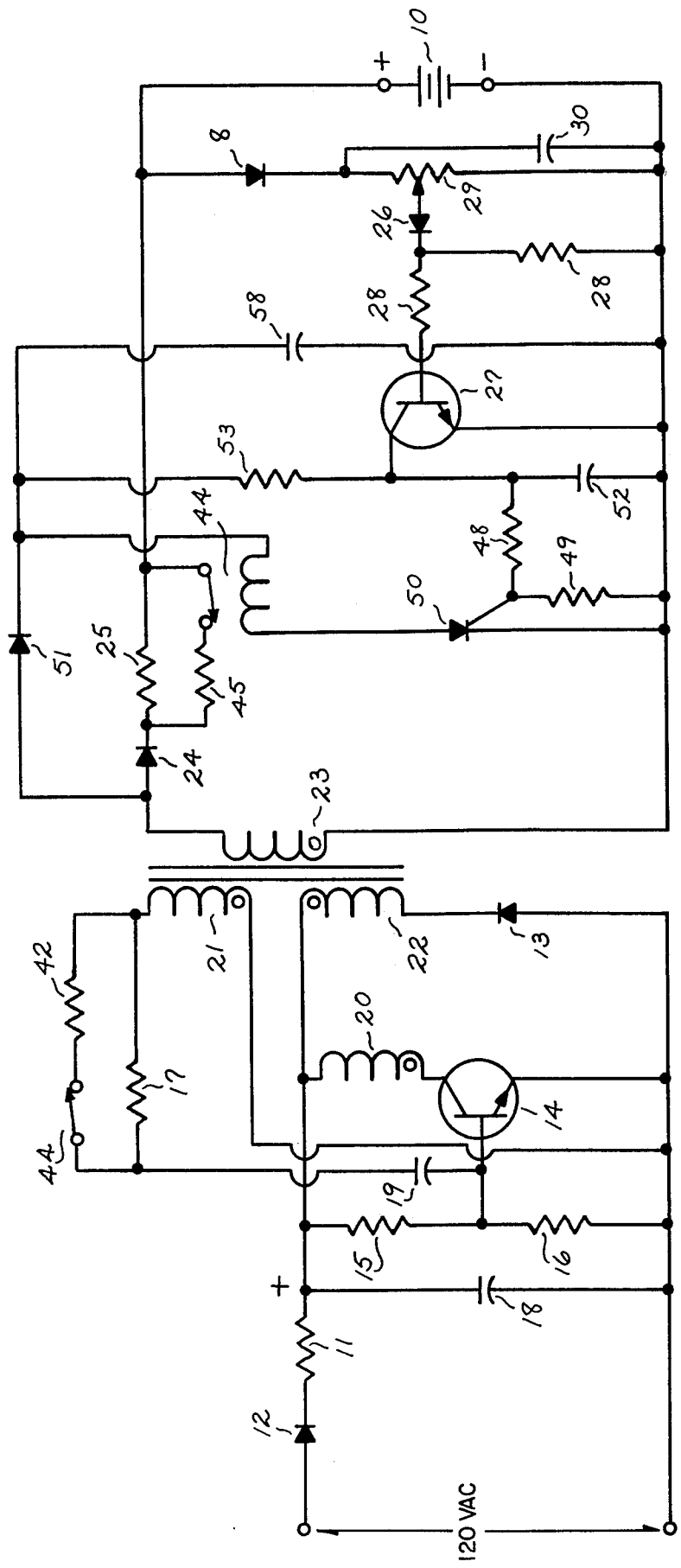
FIG. 4 is a circuit diagram of the battery charger in which current flow to the battery is terminated by a relay.

In FIG. 4 another embodiment of the charger of this invention is shown. The blocking oscillator and its components are similar to that described in FIG. 2 and thus the components thereof are correspondingly numbered and their functions previously explained. In this circuit the charger cuts off when battery 10 reaches its full charge by means of a normally closed, double pole, single throw relay 44 instead of the SCR and LED/LDR components associated with the primary winding portion of the blocking oscillator shown in FIG. 2. Relay 44 serves as a switching means for resistors 42 and 45. During the charging of the battery 10, relay 44 is closed to connect resistors 45 and 25 in parallel to give full charge to battery 10. During the charging operation and until battery 10 reaches its selected full charge, lambda diode 26 is on which causes NPN transistor 27 to turn on to allow current through rectifier 51 and resistor 53 and the transistor, bypassing resistor 48 connected to the gate of an SCR 50. SCR 50 is normally off and is connected to the actuating coil of relay 44.

When battery 10 reaches its full charge, diode 26 turns off which turns off transistor 27. This terminates the circuit bypass around the gate of SCR 50 and allows a current through resistor 48 to latch the SCR on. When SCR 50 turns on, relay 44 is activated to isolate resistors 42 and 45 from the circuit. When resistor 45 is isolated from resistor 25, the charging current is reduced to a trickle charge. Normally resistor 42 is placed in parallel with resistor 17 associated with return transformer winding 21. When resistor 42 is isolated from resistor 17, the bias to transistor 14 is changed to cause the transistor to run cooler during the trickle mode operation of the charger. Capacitor 52 prevents premature turn on of SCR 50 during initial operation of the charger. Resistor 49 reduces trigger sensitivity for SCR 50 to prevent short circuiting. Rectifier 51 and capacitor 58 isolate relay 44 and resistor 53 from battery 10 to prevent power depletion from the battery when power is disconnected from the circuit with the battery still connected into the circuit.

Figure 5:
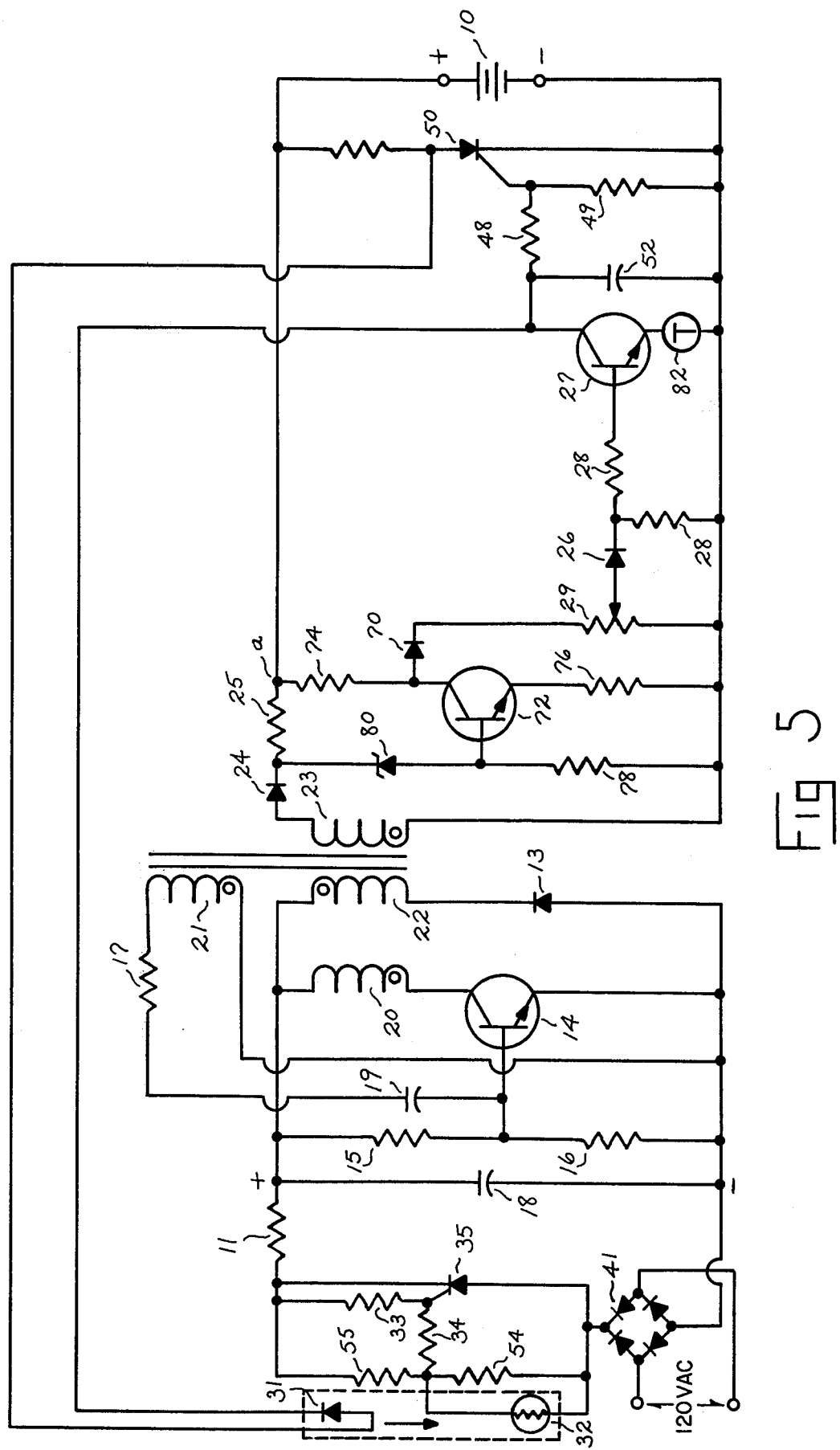
FIG. 5 is a circuit diagram of the battery charger utilizing an SCR actuated current cutoff to allow a pulsed trickle charge to the connected battery.

Another battery charger circuit is shown in FIG. 5. The blocking oscillator and a portion of the power cutoff of this circuit is like that disclosed in FIG. 2 and has correspondingly numbered components serving similar functions. Again, a bridge circuit 41 is optionally included to provide additional power for the circuit. SCR 35 in this circuit is turned on when its anode is positive with respect to its cathode and with its gate having a minimum voltage charge such as between 1-2 volts. Associated with resistor 34 connected to the gate of SCR 35 are resistors 54 and 55 which act as voltage dividers. Resistor 33 serves to prevent false triggering of the SCR. When battery 10 reaches its selected full charge, LED 31 will be appropriately turned off causing LDR 32 to assume a high impedance. This in turn causes current flow through resistors 54 and 55 with SCR 35 being momentarily turned off. When the voltage of capacitor 18 falls below the voltage at the anode of SCR 35, which will occur after SCR turn off, to a level determined by resistors 54 and 55, the SCR will turn back on for one 60 Hz half cycle to allow a pulsed trickle charge to the battery. This pulsed trickle charge cycle of SCR 35 turn on occurs each time capacitor 18 discharges.

In FIG. 5 like preceding FIG. 4, lambda diode 26 with its variable 29 is connected to the base of NPN transistor 27. During charging of battery 10 diode 26 is on which in turn switches on transistor 27 to allow current flow through the transistor to LED 31. The lighting of LED 31 in turn causes photoelectrically coupled LDR 32 to have a low impedance which in turn causes current flow to the gate of SCR 35. SCR 35 is thereby switched on to allow power to the blocking oscillator which in turn is rectified for charging usage at battery 10. With current flow through transistor 27, SCR 50 remains off. When battery 10 reaches its selected full charge, the threshhold voltage of lambda diode 26 is exceeded and the diode turns off thereby switching off transistor 27 to allow current flow through resistor 48 to switch on SCR 50. When SCR 50 switches on, it latches and remains on to short circuit LED 31. This turns diode 31 off and causes the impedance of LDR 32 to rise, switching SCR 35 into its pulsating trickle charge mode previously described.

Due to fluctuations in line voltage the charge current to battery 10 varies. Therefore the voltage applied to lambda diode 26 or any other power cutoff monitoring device of a charger could vary as much as one half a volt. Under some circumstances this may not be desirable. Therefore, in FIG. 5 there is included circuit components which serve to compensate for variations at the battery voltage sensing component or, in the case of the circuit shown in FIG. 5, lambda diode 26. Variable resistor 29 associated with diode 26 is connected to a diode 70. The anode of diode 70 is connected to the collector of an NPN transistor 72. A resistor 74 is connected between the collector of transistor 72 at the anode of diode 70 and the positive side of battery 10. Another resistor 76 is connected between the emitter of transistor 72 and negative side of battery 10. A resistor 78 is connected between the base of transistor 72 and the negative side of the battery. A zener diode 80 is connected between the base of transistor 72 and the cathode of rectifier 24. Resistor 25 is between the cathode of diode 80 and resistor 74. Rectifier 24 and resistor 25 are incorporated into the circuit as previously discussed.

When the voltage at the cathode of rectifier 24 increases or decreases due to variations in line voltage at bridge 41, the voltage across resistor 78 will change accordingly. Zener diode 80 maintains a constant voltage and is not affected by changes in line voltage. During operation of these line voltage compensating components, transistor 72 is in its active mode so that any change in voltage across the base to the emitter of the transistor will cause an inverse voltage change at its collector. Therefore as a change in voltage occurs at the cathode of rectifier 24 due to line voltage variations, a similar change in voltage occurs at the base and at the emitter of transistor 72. This change at the base and emitter of transistor 72 causes an inverse change in voltage at the collector of the transistor which offsets the change in voltage at point "a" at the positive side of the battery. In this manner line voltage fluctuations are not sensed at diode 70 and thus the cutoff voltage in turn sensed by lambda diode 26 will remain substantially constant to line voltage change but responsive to battery voltage change. In this manner battery charge cutoff is at a precise accurate value independent of the charging current into battery 10. This compensator for line voltage can be utilized with any battery charger circuit in which the battery charge power cutoff is sensed through the battery voltage.

A temperature sensing cutoff 82 which is normally closed is provided for transistor 27 to monitor battery temperature. When cutoff 82 is triggered, transistor 27 is turned off and SCR 50 latches on to start the pulsed trickle charge mode.

The circuit of FIG. 6 utilizes the blocking oscillator generally disclosed in FIG. 1, the line voltage compensating circuit explained with regard to FIG. 5 and the current or power cutoff circuit also shown in FIG. 5 with the exception that a relay 84 is substituted for the LED-LDR cutoff component in FIG. 5. For these components like reference numerals are used and their functions are as previously described. A resistor 86 is connected to the switch of relay 84 with the resistor placed in parallel with line resistor 25 when the relay is in its normally closed position. Thus in this manner relay 84 and associated resistor 86 act like relay 44 and its associated resistor 45 shown and described relative to FIG. 4. When the charge upon battery 10 reaches its selected full charge the threshhold of lambda diode 26 is exceeded causing transistor 27 to turn off thereby diverting current through resistor 48 to the gate of SCR 50. This causes the latching of SCR 50 and the actuation of relay 84 which serves to terminate current flow through resistor 86, thereby reducing the charge transmitted to battery 10 provided through resistor 25.

During a trickle charge to battery 10, transistor 14 in the blocking oscillator continues to conduct. To prevent overheating of this transistor during the trickle mode, resistor 17 in the feedback circuit in FIG. 6 of the oscillator is of the thermistor type and is physically coupled for heat conduction to resistor 25. Thus as the trickle charge flows through resistor 25 the resistor will heat up causing an increase in resistance in resistor 17 which increases the bias to transistor 14.

In FIG. 7 a resistor 81 and thermal coupled bimetal switch 82 is substituted for relay 84. Upon current flow through resistor 81 caused by the latching of SCR 50, bimetal switch 82 will be heated to open the circuit through resistor 86.

Figure 8:
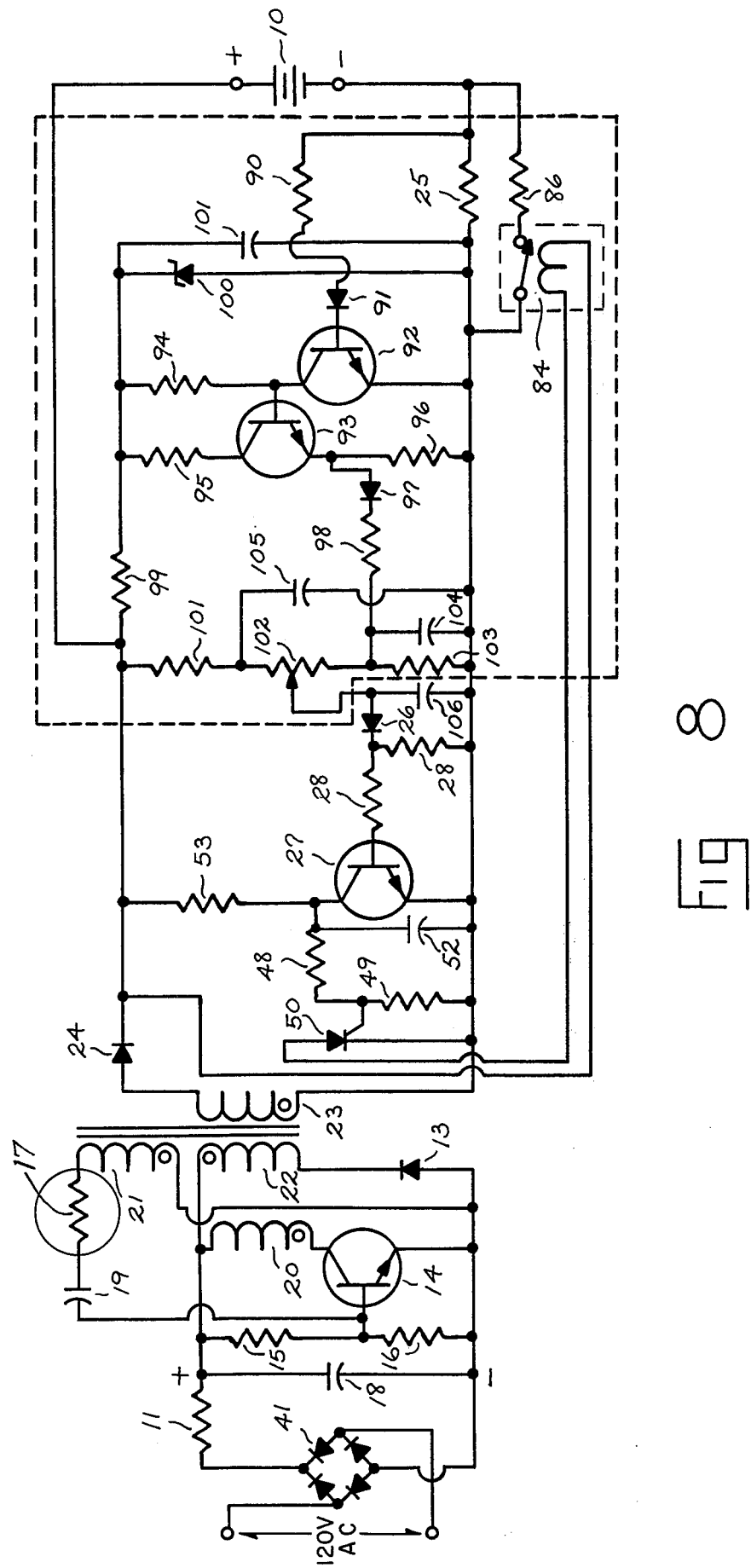
FIG. 8 is a circuit diagram of the battery charger which uses the current cutoff components of the circuit of FIG. 5 and the substitution of a relay for the LED-LDR component.

The circuit of FIG. 8 utilizes the blocking oscillator generally disclosed in FIG. 1 as well as the current or power cutoff circuit shown in FIG. 5 with the exception that a relay 84 is substituted for the LED-LDR cutoff component of FIG. 5. For these components like reference numerals are used and their functions are as previously described. A resistor 86 is connected to the switch of relay 84 with the resistor placed in parallel with line resistor 25 when the relay is in its normally closed position. Thus in this manner relay 84 and associated resistor 86 act like relay 44 and its associated resistor 45 shown and described relative to FIG. 4. When the charge upon battery 10 reaches its selected full charge the threshold of lambda diode 26 is exceeded causing transistor 27 to turn off thereby diverting current through resistor 48 to the gate of SCR 50. This causes the latching of SCR 50 and the actuation of relay 84 which serves to terminate current flow through resistor 86, thereby reducing the charge transmitted to battery 10 provided through resistor 25.

During trickle charge to battery 10, transistor 14 in the blocking oscillator continues to conduct. To prevent overheating of this transistor during the trickle mode, resistor 17 in the feedback circuit in FIG. 8 of the oscillator is of the thermistor type and is physically coupled for heat conduction to resistor 25. Thus as the trickle charge flows through resistor 25 the resistor will heat up causing an increase in resistance in resistor 17 which increases the bias to transistor 14.

In the circuit of FIG. 8, the voltage compensating circuit is of a more responsive design capable of monitoring not only voltages but also currents. An NPN transistor 92 through diode 91 and resistor 90 monitors the voltage across parallel resistors 25 and 86. An NPN transistor 93 has its base connected to the collector of transistor 92. A resistor 94 is connected between the base-collector connection of transistors 92 and 93 and the cathode of a zener diode 100. The anode of diode 100 is connected to resistor 25 with a filtering capacitor 101 connected in parallel to the diode. A resistor 95 is connected between the collector of transistor 93 and the cathode of diode 100. A resistor 96 is connected between the emitter of transistor 93 and resistor 25. The output of the emitter of transistor 93 goes through a diode 97 and resistor 98 to a capacitor 104 in parallel with a resistor 103. Resistor 103 is connected to a variable resistor 102. A filtering capacitor 105 is connected in parallel to series connected resistors 102 and 103. Resistor 99 is connected between the cathode of rectifier 24 and the cathode of diode 100. A resistor 101 is connected between resistors 102 and 99. Lambda diode 26 is connected to variable resistor 102 and a filter capacitor 106.

In operation, the charging current passing through resistors 25 and 86 is pulsed DC at a 50% duty cycle. The voltage across resistors 25 and 86 is sensed by transistor 92 which switches on at each sensed voltage peak. This in turn causes transistor 93 to operate inversely and to charge capacitor 104 when transistor 92 is off. The voltage change at capacitor 104 offsets the change in voltage at the cathode of rectifier 24 due to line voltage variations so that the voltage at resistor 102 remains substantially constant but responsive to variations in battery charging voltage. Additionally, capacitor 104 is responsive to variations in charge current for initiating charge current cutoff such as when charging a lead acid battery.

Figure 9:
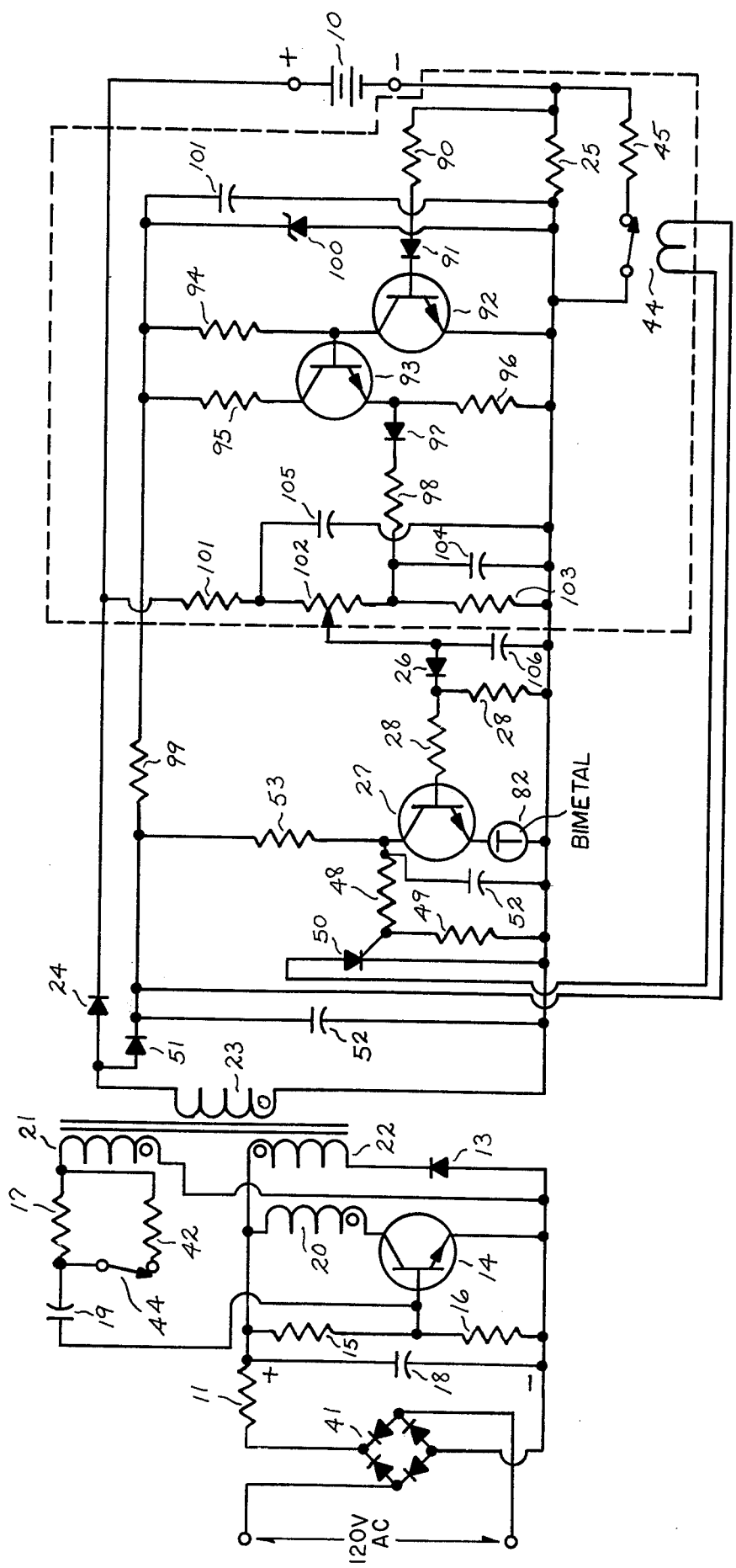
FIG. 9 is a circuit diagram of the battery charger which is similar to the circuit of FIG. 8 with selected components being modified to vary the charger operation.

In the circuit of FIG. 9, the circuit of FIG. 8 is modified by the substitution of relay 44 and associated resistors 42 and 45 of FIG. 4 for relay 84 and resistor 86 to reduce the bias of transistor 14 during trickle charge mode of operation. Also the rectifier 51 and associated capacitor 52 of FIG. 4 is incorporated into the circuit of FIG. 8 to prevent discharge of battery 10 when power is cut off with the battery connected. Resistor 17 in the circuit of FIG. 9 is a standard fixed value type and not of the thermistor type used in FIG. 8. A temperature sensing cutoff 82 which is normally closed is provided as explained in FIG. 6 to monitor battery temperature.

Figure 10:
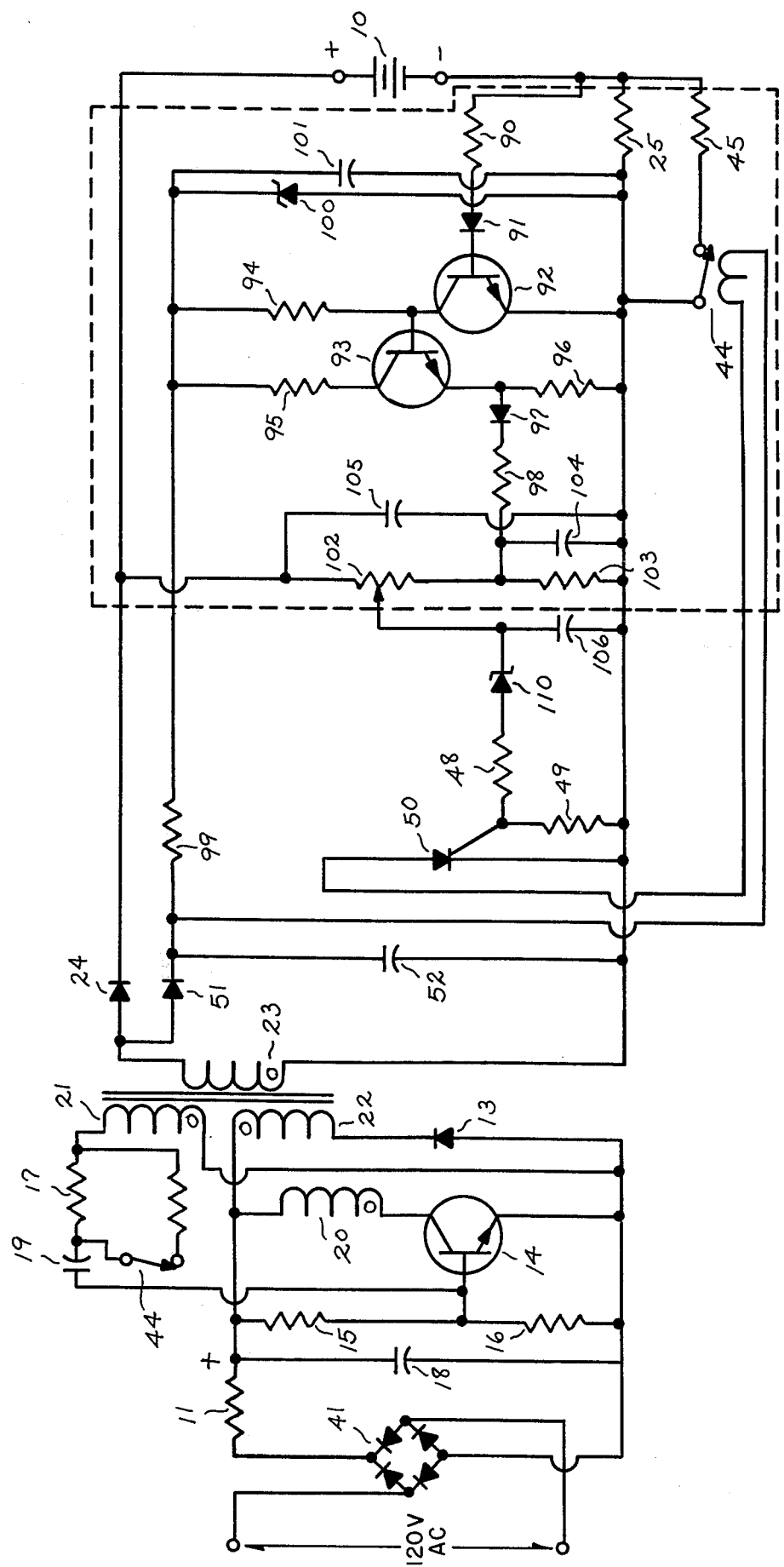
FIG. 10 is a circuit diagram of the battery charger similar to that of FIG. 9 but with the substitution of a zener diode.

The circuit of FIG. 10 is like that of FIG. 9 except a zener diode 110 is substituted for diode 26, resistors 28, transistor 27, resistor 53 and temperature cutoff 82. Zener diode 110 turns on when voltage at resistor 102 is indicative of the selected full battery charge. Upon turn on diode 110, SCR 50 latches on to activate relay 44 and begin the trickle charge mode of operation.

The zener diode 110 used in FIG. 10 does not offer the short circuit protection that the lambda diode 26 does in the preceeding described circuit.

It is to be understood that the above described invention is not to be limited to the details above given but may be modified within the scope of the appended claims.

What we claim is:

1. A high frequency charger for a battery comprising means for rectifying an AC voltage power input into a DC voltage and including negative and positive output lines, means for converting said DC voltage into a high frequency AC voltage, said converting means constituting a blocking oscillator including
a filtering capacitor connected between said output lines, a high voltage and high frequency NPN transistor having its emitter connected to said negative output line, resistance means connected between said positive output line and the base of said transistor for starting oscillation of the transistor, a main transformer winding connected between the collector of said transistor and said positive output line, a return transformer winding connected between said negative output line and through an impedance to the base of said transistor, an emf transistor winding in series with a fast recovery rectifier connected between said output lines, the anode of said rectifier facing said negative output line, said emf and main transformer windings being wound bifilar and of opposite polarity, said main and return transformer windings being of the same polarity, and a secondary transformer winding, means for rectifying said high frequency AC voltage into a DC charging voltage for said battery, means for sensing the voltage of said battery during charging and in response to a selected sensed voltage reducing the charging current into said battery, said voltage sensing and current reducing means including control means for reducing said charging current upon actuation thereof, lambda diode means to sense the voltage of said battery and to turn off at said selected sensed voltage, a second NPN transistor means responsive to turn off of said lambda diode for actuating said control means, and said control means including an emitter device and an operatively coupled receiver device, SCR means for terminating said charging current upon switch off thereof, said receiver device associated with the gate of said SCR means and serving as means for switching said SCR means on during emitter device turn on and off during emitter device turn off, said second transistor means associated wth said emitter device for turning the emitter device on when said lambda diode is on and for turning the emitter device off when said lambda diode is off.

2. Battery charger of claim 1 wherein said emitter device is an LED and said receiving device is LDR photocoupled to said LED.

3. A high frequency charger for a battery comprising means for rectifying an AC voltage power input into a DC voltage and including negative and positive output lines, means for converting said DC voltage into a high frequency AC voltage, said converting means constituting a blocking oscillator including
a filtering capacitor connected between said output lines, a high voltage and high frequency NPN transistor having its emitter connected to said negative output line, resistance means connected between said positive output line and the base of said transistor for starting oscillation of the transistor, a main transformer winding connected between the collector of said transistor and said positive output line, a return transformer winding connected between said negative output line and through an impedance to the base of said transistor, an emf transistor winding in series with a fast recovery rectifier connected between said output lines, the anode of said rectifier facing said negative output line, said emf and main transformer windings being wound bifilar and of opposite polarity, said main and return transformer windings being of the same polarity, and a secondary transformer winding, means for rectifying said high frequency AC voltage into a DC charging voltage for said battery, means for sensing the voltage of said battery during charging and in response to a selected sensed voltage reducing the charging current into said battery, said voltage sensing and current reducing means including control means for reducing said charging current upon actuation thereof, lambda diode means to sense the voltage of said battery and to turn off at said selected sensed voltage, a second NPN transistor means responsive to turn off of said lambda diode for actuating said control means, said control means including switching means responsive to the turn on of an SCR for reducing said charging current, said second transistor means providing a non-actuating bypass of said SCR when turned on by said lambda diode, means for turning said SCR on when said second transistor is turned off in response to said lambda diode.

4. Battery charger of claim 3 wherein said switching means constitutes a relay associated with resistor means for varying the line resistance to said battery.

5. The battery charger of claim 3 wherein said switching means is also for varying the bias to said first mentioned transistor to compensate for said reduced charging current.

6. The battery charger of claim 3 wherein said switching means includes a second SCR serving as means for terminating said charging current connected between said rectifying means for the AC power input and said blocking oscillator, means responsive to said second mentioned transistor turn on for switching said second SCR on to provide said charging current, said second mentioned transistor responsive means for switching said SCR off to initially terminate said charging current upon said first SCR turn on, and means associated with said second SCR and responsive to said blocking oscillator upon discharge thereof at charging current termination to cause oscillatory switching of said second SCR to provide a pulsating charging current to said battery.

7. A high frequency charger for a battery comprising means for rectifying an AC voltage power input into a DC voltage and including negative and positive output lines, means for converting said DC voltage into a high frequency AC voltage, said converting means constituting a blocking oscillator including a filtering capacitor connected between said output lines, a high voltage and high frequency NPN transistor having its emitter connected to said negative output line, resistance means connected between said positive output line and the base of said transistor for starting oscillation of the transistor, a main transformer winding connected between the collector of said transistor and said positive output line, a return transformer winding connected between said negative output line and through an impedence to the base of said transistor, an emf transistor winding in series with a fast recovery rectifier connected between said output lines, the anode of said rectifier facing said negative output line, said emf and main transformer windings being wound bifilar and of opposite polarity, said main and return transformer windings being of the same polarity, and a secondary transformer winding, means for rectifying said high frequency AC voltage into a DC charging voltage for said battery, means for sensing the voltage of said battery during charging and in response to a selected sensed voltage reducing the charging current into said battery, said sensing and current reducing means including control means for reducing said charging current upon actuation thereof, a zener diode means to sense the voltage of said battery and to turn on at said selected sensed voltage for actuating said control means, and said control means including switching means responsive to the turn on of an SCR for reducing said charging current, said zener diode means for turning on said SCR at said selected sensed voltage.

8. The battery charger of claim 7 wherein said switching means constitutes a relay associated with resistor means for varying the line resistance to said battery.

9. The battery charger of claim 8 wherein said switching means is also for varying the bias to said first mentioned transistor to compensate for said reduced charging current.

* * * * *